United States Patent [19]

Toyoda et al.

[11] 4,196,989
[45] Apr. 8, 1980

[54] TTL METERING SYSTEM AUTOMATIC EXPOSURE CONTROL CAMERA

[75] Inventors: Kenji Toyoda, Kawasaki; Sakuji Watanabe, Warabi; Yoshitaka Araki, Tokyo, all of Japan

[73] Assignee: Nippon Kogaku K.K., Tokyo, Japan

[21] Appl. No.: 969,368

[22] Filed: Dec. 14, 1978

[30] Foreign Application Priority Data

Dec. 14, 1977 [JP] Japan .................................. 52-149334

[51] Int. Cl.² .................................................. G03B 7/08
[52] U.S. Cl. ...................................... 354/38; 354/42; 354/51; 354/60 R
[58] Field of Search ..................... 354/38, 42, 43, 44, 354/50, 51, 60 R, 60 L

[56] References Cited

U.S. PATENT DOCUMENTS

| | | | |
|---|---|---|---|
| 3,950,765 | 4/1976 | Nanba et al. | 354/38 |
| 4,042,940 | 8/1977 | Matsuda et al. | 354/38 |
| 4,089,014 | 5/1978 | Ueda et al. | 354/38 |
| 4,104,655 | 8/1978 | Strauss | 354/38 |
| 4,112,441 | 9/1978 | Kawasaki | 354/38 |
| 4,119,978 | 10/1978 | Konodo | 354/38 |

Primary Examiner—Russell E. Adams
Attorney, Agent, or Firm—Fitzpatrick, Cella, Harper & Scinto

[57] ABSTRACT

An improvement in TTL metering system automatic control camera is disclosed. This type of camera requires a complicate control mechanism. According to the present invention, a substantial simplification of the mechanism is attained by providing the camera with a switch means interlocked with a shutter releasing operation and operable before the diaphragm being conrtrolled by a diaphragm control device, first and second holding circuits, a delay circuit, means for introducing the output of the first holding circuit into the diaphragm control device and means for introducing the output of the second holding circuit into a shutter control device.

5 Claims, 9 Drawing Figures

TTL METERING SYSTEM AUTOMATIC EXPOSURE CONTROL CAMERA

BACKGROUND OF THE INVENTION

1. Field of the Invention

The present invention relates to a TTL metering system automatic exposure control camera.

2. Description of the Prior Art

Such type of camera has been known in the art in which a metering signal resulting from TTL metering is suitably converted to obtain information of a shutter speed preset such as that of a predetermined program shutter speed or that of shutter speed predetermined by a manual setting operation, and the output corresponding to the preset shutter speed and the metering signal obtained in the course of stopping-down of the lens aperture after the shutter releasing are compared with each other. When the two signals compared reach a predetermined relation, the stopping-down operation is brought to end and thereby the shutter speed is finally controlled depending upon the metering signal including information of the aperture value thus determined.

For such type of camera it is required to store the output of measured light twice, one time immediately before the start of aperture stopping-down step and one time after the completion of the step and before the start of turning-up movement of a mirror. This makes the mechanism of the camera very complicate.

SUMMARY OF THE INVENTION

Accordingly, it is a primary object of the invention to provide a camera of the above mentioned type which is simple in structure and arrangement.

According to the invention, this object is attained by forming a circuit which enables to effect the above mentioned two separate memory operations by using only one single switch interlocked with the diaphragm control device.

Other and further objects, features and advantages of the invention will appear more fully from the following description taken in connection with the accompanying drawings.

BRIEF DESCRIPTION OF THE DRAWINGS

FIGS. 2A to 2C show, in detail and partly, the mechanical arrangement of the diaphragm control circuit 3 and the shutter control device 4 shown in FIG. 1, wherein FIG. 2A is a left side view, FIG. 2B is a right side view and FIG. 2C is a bottom view thereof;

DESCRIPTION OF THE PREFERRED EMBODIMENTS

Figure 1:
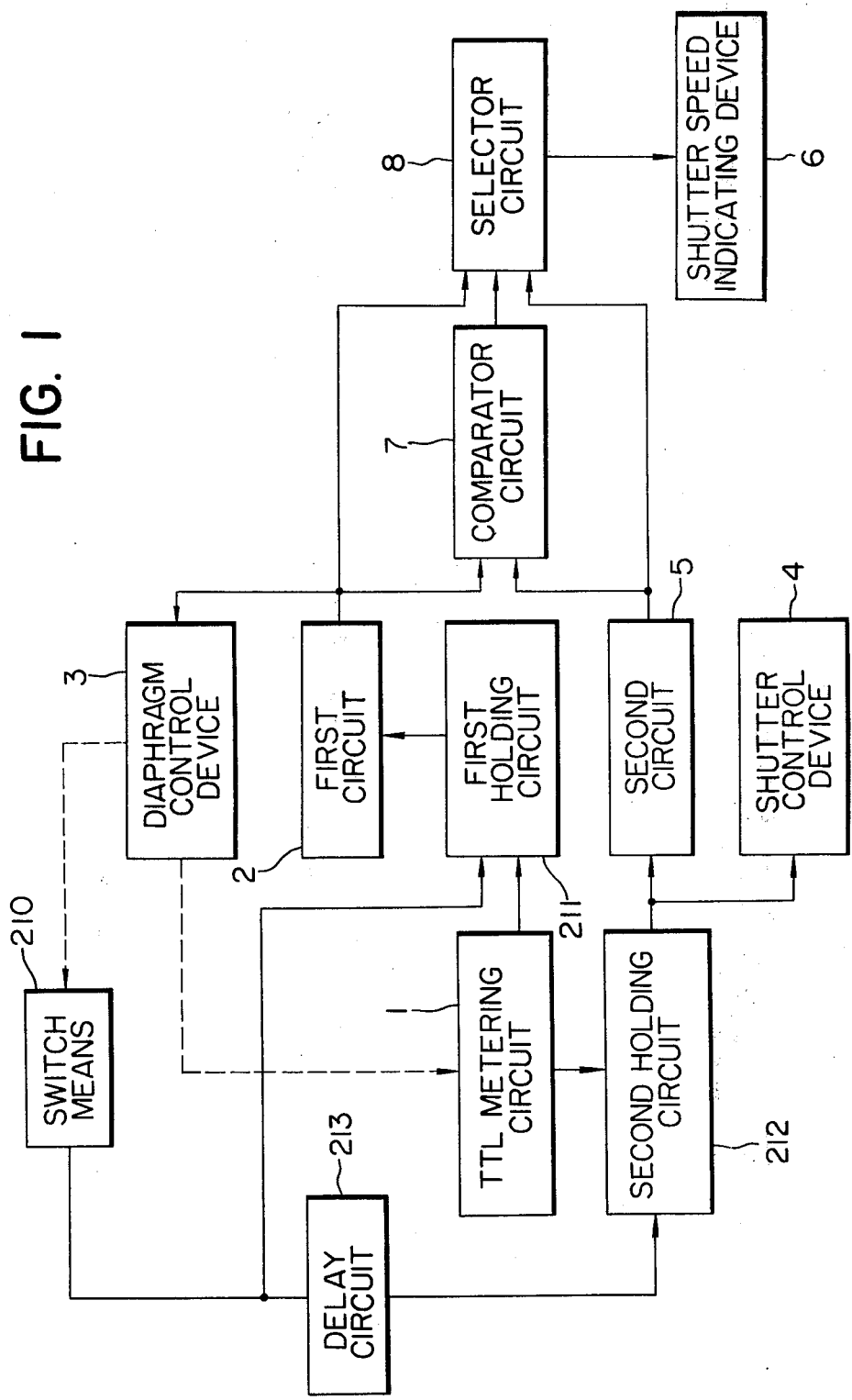
FIG. 1 is a block diagram showing a basic arrangement of the indication apparatus in a TTL metering system automatic exposure control camera according to the invention.

FIG. 1 is a block diagram showing the basic arrangement of exposure control system in accordance with the invention. Designated by 1 is a TTL metering circuit which receives light coming from an object to be photographed through a photographing lens and produces a metering signal corresponding to the brightness of the object. 2 is a first circuit for producing a first signal (preset signal) corresponding to the programmed shutter speed predetermined by the metering signal from the metering circuit 1 or corresponding to the shutter speed manually preset in link with a shutter speed setting dial or the like. Desingted by 3 is a diaphragm control device for determining diaphragm aperture value in accordance with the first signal coming from the first circuit 2 and information of the brightness of the object and automatically adjusting a diaphragm for the photographing lens in accordance with the aperture value then determined. 4 is a shutter control device for automatically controlling the shutter speed relying upon the metering signal issued after the diaphragm has been adjusted by the diaphragm control device 3. The metering signal applied to the shutter control device contains information of the brightness of the object as well as that of diaphragm. Therefore, it is possible to obtain such information of shutter speed which corresponds to the values of diaphragm and brightness appearing after setting the aperture.

Reference numeral 5 designates a second circuit for producing a second signal corresponding to the shutter speed determined by the information of brightness and diaphragm aperture lying in the limit of control range. 6 is an indicator for indicating the shutter speed then controlled. This indication may be made as an analogue indication using a meter or the like or as a digital one using luminant elements. To compare the first signal with the second one there is provided a comparator circuit 7. Either one of the first and second signals is selectively introduced into the indicator 6 through a selector circuit 8 which receives the output of the comparator circuit 7.

The reference numeral 210 designates a switch means operable in an interlocked relation with the releasing operation. Namely, the switch means 210 is actuated by the operation of the diaphragm control mechanism 3 through a releasing motion prior to the setting of the diaphragm. When the switching means 210 is actuated, a first holding circuit 211 is brought into a position to hold the first signal mentioned above. A certain predetermined time after the actuation of the switch means 210, a second holding circuit 212 holds a metering signal coming from the metering circuit 1 which is now in a position to measure the object light passed through the diaphragm set by the diaphragm control device 3. The reference numeral 213 designates a delay circuit.

The manner of operation of the above described apparatus is as follows:

At the beginning of operation, the metering circuit 1 effects metering of light under the condition of the diaphragm being full open (maximum aperture) and the metering signal resulted therefrom is applied to the first circuit 2. The first circuit produces a first signal corresponding to the shutter speed predetermined by the metering signal or by a manual presetting operation. The first signal thus produced is applied to one of the inputs of the comparator circuit 7. On the other hand, the second circuit 5 issues a second signal corresponding to the shutter speed determined by the information of diaphragm aperture and object brightness lying in the limit of the range in which control is allowable. The second signal is applied to the other input of the comparator circuit 7.

At the second step of operation starting with pushing down a shutter button, the actuation of the switch means 210 brings the first holding circuit into operation to store the first signal. At the same time, the delay circuit 213 receives a signal from the switch means 210 and starts operating. Thereafter, the diaphragm control mechanism 3 determines the aperture of diaphragm depending upon the first signal stored in the holding circuit as well as the information of brightness of the object and automatically adjusts the aperture stop of the photographing lens to the determined value. After the aperture of the diaphragm being set in this manner the second holding circuit 212 receives an output from the delay circuit 213 and holds the metering signal issued from the metering circuit 1.

At the end of this step of operation, the shutter control mechanism 4 automatically controls the shutter speed in response to the output of the second holding circuit 212 which, at that time, has information of the shutter speed corresponding to the aperture value given after setting. When the object is too bright or too dark for the control of diaphragm, there may occur such case in which no value of diaphragm aperture can be found to be set for the detected brightness of the object. In such case, the diaphragm control device 3 sets the diaphragm to its maximum aperture or its minimum aperture. In this case, the shutter speed is controlled depending upon the second signal and therefore it is, of course, different from the shutter speed controlled depending upon the first signal.

The comparator circuit 7 compares its two inputs, that is, the first signal and the second signal. When the shutter speed controlled by the shutter control device 4 corresponds to the first signal, the comparator circuit 7 introduces the first signal into the indicator 6 through the selector circuit 8. If the shutter speed becomes impossible to correspond to the first signal, then the comparator circuit 7 will apply the second signal to the indicator 6 through the selector circuit 8.

In this manner, the indicator 6 always shows a shutter speed actually controlled at that time.

According to the above described embodiment of the invention, the first holding circuit 211 comprises an analog switch and a condenser. The analogue switch is adapted to cut off the connection of the metering signal and the first signal through the operation of the switching means 210. The condenser is adapted to store at least one of the two signals replying to the cut-off operation of the analogue switch. Also, the second holding circuit 212 comprises an analog switch and a condenser. The analogue switch contained in the second holding circuit is adapted to cut off the connection of the metering circuit 1 and the shutter control device 4 only when a certain predetermined time has been elasped since the operation of the switching means 210 and an aperture value has already been set for the diaphragm by the diaphragm control device 3. Through this cut-off operation of the analogue switch, the condenser stores the metering signal coming from the metering circuit 1.

Now, the mechanical arrangement of the embodiment of the present invention will be described in detail with reference to FIGS. 2A to 2C.

Figure 2A:
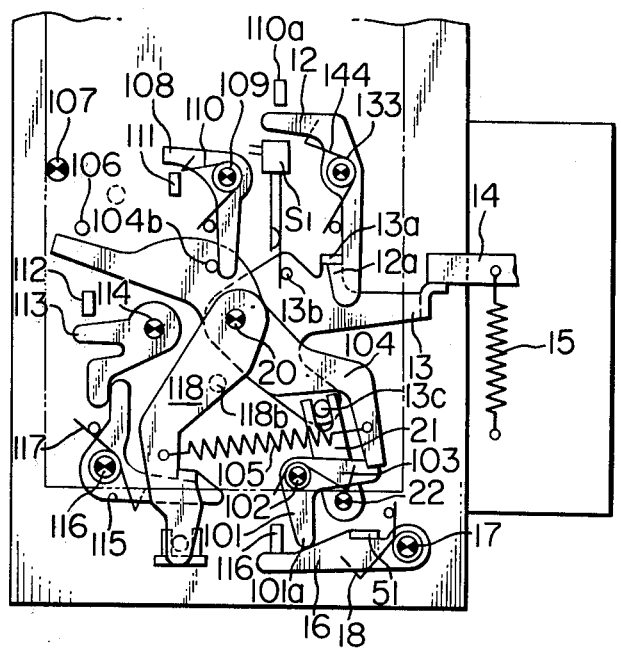
Figure 2B:
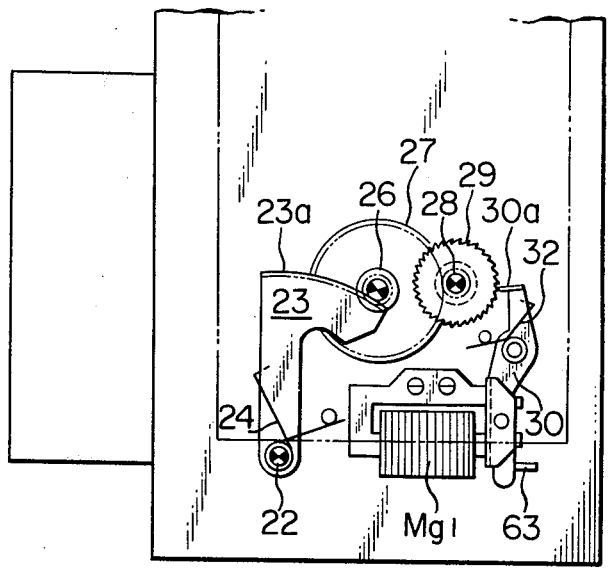

In FIG. 2A, the reference numeral 9 designates a camera body having a lens 9a and 10 designates a mirror box. By pushing down a shutter button (not shown), an upper pawl 11a and a lower pawl 11b are pressed down so as to rotate a click lever 12 about the rotational axis 133 counter-clockwise against the force of a spring 144 and to rotate click lever 16 about the rotational axis 17 counter-clockwise against the force of a spring 18 respectively. This movement results in an disengagement of the click 12a of the click lever 12 from the click 13a of a diaphragm operating lever 13. Now, the diaphragm operating lever 13 starts rotating clockwise around the rotational axis 20 together with a stopping-down lever 14 under the action of a spring 15 secured to the lever 14. The stopping-down lever 14 is provided for the lens 9a and works to operate a diaphragm blade not shown. At the first step of this rotational movement, switch S1 is opened. The rotation of the lever 13 causes an intermediate lever 21 to rotate counter-clockwise through the engagement with a pin 13c. The rotational movement of the intermediate lever 21 is transmitted to a sector lever 23 through an intermediate shaft 22 (see FIG. 2B). On a portion of the sector lever 23 there is formed a gear 23a the rotation of which is speeded up through gears 26 and 27 and then transmitted to a ratchet gear 29.

Figure 2C:
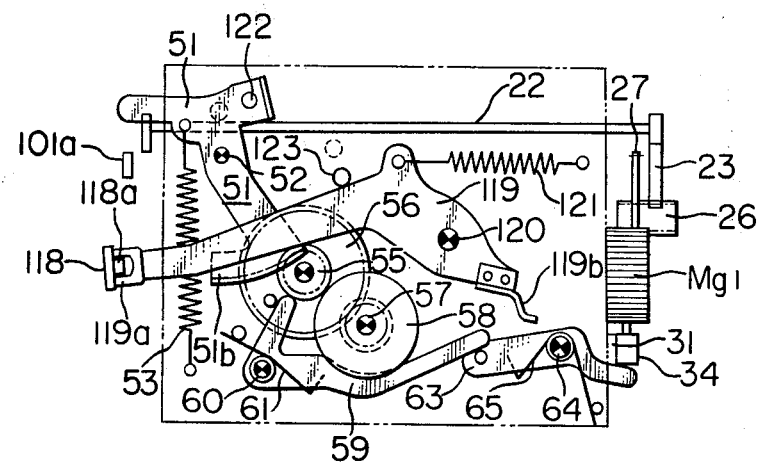

On the other hand, when the click lever 16 is driven into rotation by pushing down the shutter button in the above mentioned manner, the engaging portion 16a thereof is disengaged from a lever 51 and therefore the lever is allowed to rotate counter-clockwise about its rotational axis 52 under the action of a spring 53 (see FIG. 2C). The lever 51 has a gear 51b in mesh with a gear 55. Gears 55, 56 and 57 and a fly-wheel 58 constitute a delay mechanism the function of which is to delay the speed of operational motion of the lever 51. Since a stud pin 56a on the gear 56 is moved to its retracted position as the gear 56 rotates clockwise at the first step of operational motion of the lever 51, it is allowed for a lever 59 to rotate counter-clockwise about the axis 60 under the action of spring 61. This in turn causes a holding lever 63 to rotate clockwise around its axis 64 under the action of a spring 65. Thereby, a lever 30 is released from the force exerting on it to press it against an electromagnet Mg1 (FIG. 2B). However, as will be described later, a power source switch SW is closed to energize the electromagnet Mg1 at the first stage of pushing down the shutter button. Therefore, even after the lever 30 has been released from the pressing force mentioned above, the electromagnet Mg1 continues to attract the piece of iron 34 so as to hold the lever 30 unmoved.

With the upward movement of the stopping-down lever 14 for the lens under the action of the spring 15, the lens is gradually stopped down from the maximum aperture toward the minimum by a mechanism known per se. Upon the time when the aperture reaches a proper value during this course of lens stopping-down, a circuit as will described hereinafter is brought into operation to deenergize the electromagnet Mg1. As a result, the piece of iron 34 is released from the attraction force of the magnet and the lever is allowed to rotate counter-clockwise under the action of the spring 32 so that its pawl 30a can come into engagement with the ratchet gear 29 o stop it.

When the lever 51 is further rotated counter-clockwise from the position shown in FIGS. 2A and 2C, the lever comes into contact with a portion 101a of a lever 101 at a time point near to the end of the rotational movement of the lever 51. Thereby, the lever 101 is rotated clockwise about its axis 102 against the force of a spring 103 and finally the lever 101 is disengaged from a lever 104. Now, the lever 104 starts rotating clockwise under the action of a spring 105. During the rotation of the lever 104, it comes into contact with a pin 106 secured on a mirror receiving member not shown and pushes the pin up so that the mirror is turned around its rotational axis 107 upwardly. With the rotation of the lever 104, a lever 108 is also rotated counter-clockwise about its axis 109 by a pin 104b against the force of a spring 110. At the end of the rotation of the lever 104, the lever 108 pushes down a shutter releasing lever 111 so as to effect releasing the shutter.

When a given exposure time has been elapsed and the running of rear membrane of a focal plane shutter has been completed, a signal lever of the shutter starts moving downwardly. As a result, the lever 115 is rotated clockwise about its axis 116 against the force of a spring 117 through an intermediate lever 113 (FIG. 2C). This rotational motion results in disengagement of a lever 118 from the lever 115. Now, a lever 119 is allowed to rotate clockwise about its axis 120 under the action of a spring 121. Since a portion 119a of the lever 119 and a pin 118a secured on the lever 118 are in engagement with each other, the lever is driven into rotation counter-clockwise. At the first step of rotational movement of the lever 119, one end 119a of the lever comes into contact with the lever 63 and then rotates the latter counter-clockwise so as to disengage the pawl 30a of the lever 30 from the ratchet gear 29. A further rotational movement of the levers 118 and 119 brings a pin 118b secured on the lever 118 into contact with the levers 104 and 13 so as to return the system comprising a series of elements 21, 22, 23, 26, 27, 28, 29 now in contact with the levers back to the position shown in FIG. 2. Therefore, the pin 106 is returned to its starting position under the action of a spring not shown and the mirror moves downward. Also, the return of the lever to its starting position allows the diaphragm to return back to its maximum aperture position.

Now, one cycle of photographing procedure comes to end and a succeeding operation of a winding-up lever not shown will cause the pin 122 to move clockwise and then the levers 119 and 118 to return back to the positions shown in FIG. 2C respectively.

Now, referring to FIGS. 3A and 3B, description will be made as to programs used for program shutter.

Figure 3A:
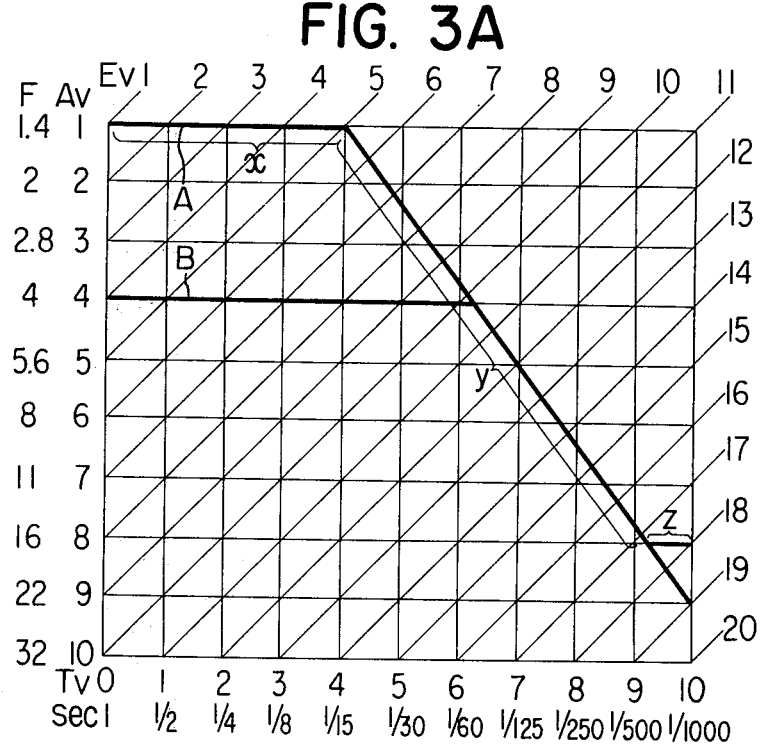
FIGS. 3A and 3B are program diagrams showing examples of shutter speed program.
Figure 3B:
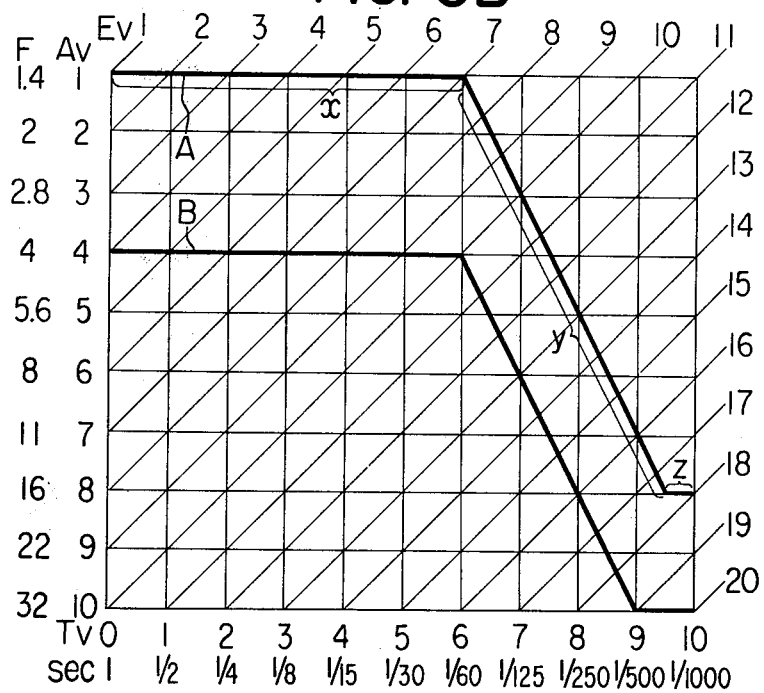

For a camera in which lens is exchangeable as in the case of a single-eye reflex camera there may be considered two different program systems as shown in FIGS. 3A and 3B in in view of the manner of processing the difference between the maximum stop aperture and the minimum one of lens then used. In the examples of FIGS. 3A and 3B, there are used two typical lenses, that is, a lens having the maximum aperture of F 1.4 and the minimum aperture of F 16 (hereinafter referred to as lens A) and a lens having the maximum aperture of F 4 and the minimum aperture of F 32 (hereinafter referred to as lens B). Each control curve of the shown programs may be divided into three sections, x, y and z. In the section x, only the shutter speed changes with the increase of Ev while the diaphragm remains unchanged at its maximum aperture. In the section y, both of aperture value and shutter speed change. The section z is a section where only the shutter speed changes while the diaphragm remains unchanged at the position of the minimum aperture.

In case of the program system shown in FIG. 3A, section y is common to lenses A and B. However, in the program system shown in FIG. 3B, the section y of lens B is moved from the section y of lens A in a manner of parallel translation. The relative formula of section y in each case will be given as follows: For the sake of simplification of formula, APEX notation (Av, Tv, Ev, Bv, Sv) is used in the following description.

For the section y of FIG. 3A, a simple consideration leads to the following equation:

$$Tv = 0.75\,Av + 3.25 \tag{1}$$

$$= 0.75\,(Av - Av_o) + 0.75\,Av_o + 3.25$$

wherein
$Av_o$ is Av value of the maximum lens aperture.
For the section y of FIG. 3B, $$Tv = 0.5\,(Av - Av_o) + 6 \tag{2}$$

Therefore, as a general formula for section y, there is given:

$$Tv = \alpha(Av - Av_o) + \beta Av_o + \gamma \tag{3}$$

wherein $\alpha, \beta, \{$ are constants and for the system of FIG. 3A $\beta = \alpha$ whereas $\beta = 0$ for the system of FIG. 3B.

The reason why the variable of aperture stop value is represented by $(Av - Av_o)$ instead of Av is that in case of TTL metering system the former is more convenient for mathematic handling than the latter.

The formula of proper exposure in APEX notation is known as $$Av + Tv = Bv + Sv$$

Substituting this in the formula (3) gives:

$$Tv = \alpha(Bv + Sv - Tv - Av_o) + \beta Av_o + \gamma$$

$$Tv = \frac{\alpha}{1 + \alpha}(Bv + Sv - Av_o) + \frac{1}{1 + \alpha}(\beta Av_o + \gamma) \tag{4}$$

The above formula (4) means that for a given brightness of object, a given light sensitivity of film and a given maximum aperture of lens, a shutter speed lying on the rectilinear segment y of FIG. 3A or 3B and satisfying the condition of proper exposure can be computed using the formula (4).

Figure 4:
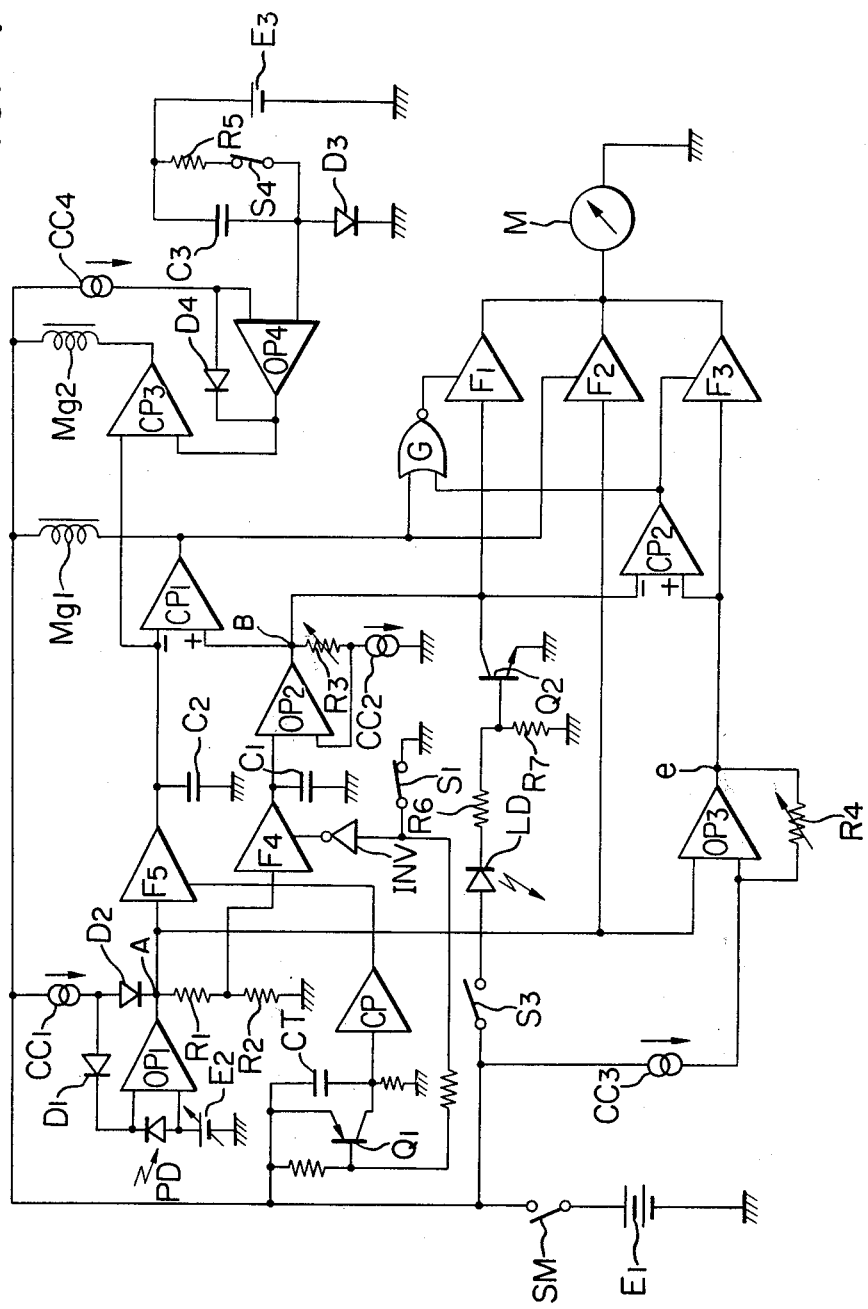
FIG. 4 is a circuit diagram showing the concrete arrangement of circuit of the apparatus shown in FIG. 1.

Referring now to FIGS. 4 and 5, the electric circuit used in the above described embodiment and the manner of operation thereof will be described.

For program mode of photographing, switch S3 is opened to turn it OFF at first, and then the operator sets the lens stop ring (diaphragm) to the minimum aperture (F 16 for lens A or F 32 for lens B). After that, the operator can push down the shutter button. When the operator pushes it down, a power source switch SM is cut in at the first step of the downward movement of the shutter button and electric current is supplied to the whole system of the circuit from a power source cell E1. Since switch S1 is ON at this time, the output of inverter INV is at H(high) level. Transistor Q1 is turned ON at this time and therefore the output of comparator CP4 is also at H level. Voltage followers designated by F4 and F5 have enabling terminals (control terminals) respectively. The voltage follower each has such property that when the enabling terminal is at H level, the voltage follower puts out from its output terminal an input voltage as the voltage follower received it and when the enabling terminal is at L(low) level, the output voltage from the voltage follower becomes indefinite and its output impedance becomes infinitely large. Therefore, in the position of circuit mentioned above, the voltage followers F4 and F5 are in the firstly mentioned position in which they put out from their output terminals input voltages as they received since H level voltage is applied to the voltage follower F4 from the inverter INV and H level voltage from the comparator CP4 is applied to F5 respectively at this time. These voltage followers function as analogue switches and therefore they may be replaced by transistors or FETs. Photo diode PD receives the light passed through the lens and diaphragm and generates photoelectric current the intensity of which is directly proportional to the intensity of the received light. This photoelectric current is subjected to a logarithmic suppression by amplifier OP1 and diode D1. To compensate the temperature characteristics of the diode D1 there are provided a constant current source CC1 and a diode D2.

Until this stage of operation, the levers 12 and 16 previously described with reference to FIGS. 2A to 2C have not moved yet and therefore the aperture stopping-down lever 14 is held at its maximum aperture position by the lever 13 to keep the aperture of lens fully open. This position corresponds to that shown in FIG. 2A. Thus, the intensity of light incident upon the photo diode PD in this position will correspond to the value given by subtracting the information of the maximum lens aperture from the object light. Its logarithmically suppressed value becomes $(Bv - Av_o)$ in the term of APEX notation. To the input of the amplifier OP1 is applied a voltage corresponding to the film sensitivity information Sv from a variable constant voltage circuit E2. Therefore, the voltage appearing at the point A, the output terminal of the amplifier OP1 becomes:

$$V_A = (Bv + Sv - Av_o) \quad (5)$$

This voltage at point A is divided by resistors R1 and R2. These resistors R1 and R2 are so adjusted as to have a resistance ratio equal to $\alpha/1+\alpha$ in the previously given formula (4). Thus, the voltage at the connection point of R1 and R2 becomes $\alpha/(1+\alpha) (Bv+Sv-Av_o)$. This voltage is applied to the amplifier OP2 through the voltage follower F4. At the amplifier OP2, there is added further the information of $1/(1+\alpha) (\beta Av_o + \gamma)$ by means of the constant current source CC2 and the variable resistor R3. As a result, the voltage $V_B$ at the point B of the output terminal of the amplifier OP2 becomes:

$$V_B = \frac{\alpha}{1+\alpha}(Bv + Sv - Av_o) + \frac{1}{1+\alpha}(\beta Av_o + \gamma) \quad (6).$$

which corresponds to Tv of the formula (4).

In case of the program shown in FIG. 3A, R3 must be variable with the change of lens aperture. However, in case of FIG. 3B program, as R3, there may be used a fixed resistance corresponding to r because $\beta = 0$.

The output voltage of the amplifier OP1, that is, the voltage at point A is applied to the input terminal of amplifier OP3 on the other hand. In this amplifier OP3, the aperture value preset for the diaphragm ring, that is, the information of $((Av) \text{ preset} = Av_o)$ in the term of APEX notation is subtracted from the above voltage by the constant current source CC3 and a variable resistor R3 the resistance of which varies with the movement of the diaphragm ring. In the case now being considered, the diaphragm ring is set to the minimum aperture value, that is, Av min. Therefore, the voltage $V_C$ at the point C of the output terminal of the amplifier OP3 becomes:

$$(Bv + Sv - Av_o) - (Av \min - Av_o) = Bv + Sv - Av \min \quad (7)$$

Comparing the above formulae (5), (6) and (7) with the known formula for proper exposure in APEX notation, $$Av + Tv = Bv + Sv$$

namely, $$Av = Bv + Sv - Av,$$

one can understand the following facts:

At the first stage of releasing operation, the voltage $V_A$ at point A (metering signal serving also as the second signal) shows a value of Tv which can satisfy the requirements for proper exposure at the maximum aperture, that is, Tv value (Tv)a at the section x of the program diagram shown in FIG. 3. The voltage $V_B$ at point B (the first signal) shows a value of Tv, (Tv)b at the section y of the program diagram. The voltage $V_C$ at point C shows a value of Tv which can satisfy the requirements for proper exposure at the minimum aperture, that is, Tv value (Tv)c at the section z of the program diagram.

Voltage $V_A$ is further applied to the voltage follower F2, and to the comparators CP1 and CP3 through the voltage follower F5, voltage $V_B$ to the voltage follower F1 and the comparators CP1 and CP2, and voltage $V_C$ to the voltage follower F3 and the comparator CP2 respectively.

If $V_V > V_A$, then (Tv)b > (Tv)a. Under this condition, however, control in accordance with the section y of the program curve is not allowable. If the control of diaphragm be made following the section y, then the value of aperture to be set for the diaphragm would be a value larger than the maximum lens aperture. Therefore, under this condition, the aperture stop is necessarily controlled in accordance with the section x of the program. In this instance, the output of the comparator CP1 becomes H level and the output of the comparator CP2 becomes L level because $V_C$ is always smaller than $V_A$. Therefore, the enabling terminal of the voltage follower F1 is set to L level by the output of NOR-gate G, that of F2 is set to H level and that of F3 is set to L level respectively. Thus, voltage $V_A$ is applied to the meter M through F2.

Under the condition of $V_A > V_C > V_B$, if control be made in accordance with the section y of the program curve, then there would occur such case in which the aperture must be stopped down to a value smaller than the minimum aperture value. Therefore, under this condition, the aperture stop is controlled in accordance with the section z of the program curve. In this instance, the comparator CP1 puts out an output of High level and the comparator CP2 issues an output of Low level. As a result, the enabling terminal of the voltage follower F1 is set to L level, that of F2 is to Low level and that of F3 is set to High level respectively. Thus, voltage $V_C$ is applied to the meter M through F3.

Figure 5A:
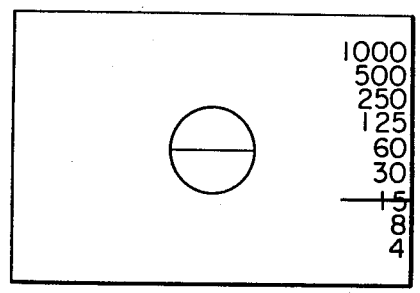
FIGS. 5A and 5B illustrate two different types of indicator used in indicating the shutter speed.
Figure 5B:
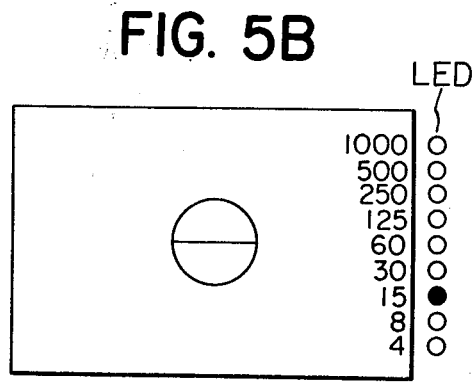

As will be understood from the foregoing, an indication of correct values of Tv to be controlled can be attained by using a meter to which voltage $V_A$ is applied for the exposure control following the section x of the program diagram, $V_B$ is applied for the section y and $V_C$ is applied for the section z, and a scale of shutter speed disposed opposed to the pointer of the meter as shown in FIG. 5A. Instead of a meter, a combination of luminescence diode LED and a scale of shutter speed as shown in FIG. 5B also may be used to indicate the values of Tv.

At the next step of operation, a further pushing-down of the shutter button makes the levers 12 and 16 released from the locking engagement in a manner as described previously and the lever 14 moves downwardly as viewed in the drawings of FIG. 2A so as to stop down the aperture of lens. But, when the switch S1 is turned OFF before the aperture being stopped down, the output of the inverter INV becomes L level and the output impedance of the voltage follower F4 becomes infinitely large. Therefore, the voltage appearing at the connection point of the resistors R1 and R2 is stored in the condenser C1 and thereby the voltage $V_B$ is fixed. At the same time, the transistor Q1 is turned OFF and a delay circuit composed of resistor $R_T$, condenser $C_T$ and comparator CP4 starts operating. This delay circuit is set to have such delay time that after the setting of diaphragm has been completed and immediately before the mirror starts moving upwardly, the comparator CP4 changes into the position for putting out an output of L level. When the aperture is gradually stopped down with time, the quantity of light incident upon the photo diode PD becomes a value given by subtracting the information of aperture stopped down at that time point from the brightness of the object. Therefore, the output voltage $V_A$ of the amplifier OP1 becomes (Bv+Sv−Av), namely only the metering signal. This signal represents a value of Tv which satisfies the requirements of proper exposure and corresponds to the information of aperture at the moment. The voltage $V_A$ and the fixed voltage $V_B$ are compared with each other in the comparator CP1 and at the time point when there occurs a coincidence of $V_A$ and $V_B$, the output of the comparator CP1 turns into H level. As a result, the current flowing into the magnet Mg1 is cut off and the tip end 30a of the lever 30 comes into engagement with the pawl of the ratchet gear 29 so as to fix the stopping-down lever 14 in the position which the lever has just taken at that time point. Thus, the aperture stopping-down motion is stopped. After that, but immediately before the mirror starts moving upwardly, the comparator CP4 issues a L level output. Accordingly, the output impedance of the voltage follower F5 becomes infinite and thereby the voltage $V_A$ is stored in the condenser C2. This voltage $V_A$ thus stored becomes one of the inputs to the comparator CP3. When the mirror is turned up and the shutter is released by the lever 108, the trigger switch S4 opens simultaneously with running of the fore membrane of the shutter. Also, a circuit for logarithmic conversion of time composed of amplifier OP4, constant voltage circuit E3, condenser C3, diodes D3 and D4, resistor R5 and constant current source CC4 starts operating. This circuit produces an output voltage corresponding to Tv value of exposure time beginning with the start of running of the shutter fore-membrane. Upon the time when this Tv value becomes identical with the stored voltage $V_A$, the comparator CP3 is brought into operation to deenergize the electromagnet Mg2. As a result, the rear membrane of the shutter starts running.

To select the diaphragm preference mode on the apparatus, the switch S3 is turned ON. This closing of the switch S3 makes the luminescence diode LD put on, which indicates that the photographing mode now set on the camera is diaphragm preference mode. At the same time, current is allowed to flow into R6 and R7 so that transistor Q2 is turned on. Thereby, the voltag $V_B$ is forcedly lowered to ground level. Since the information of the value ( (Av) preset−$Av_o$) manually preset on the diaphragm is given by the resistor R4, the value of voltage $V_C$ becomes Bv+Sv−(Av) preset. Therefore, a value of Tv giving a proper exposure for the set value of aperture can be obtained. Since, as previously noted, the voltage $V_B$ becomes smaller than $V_C$ on the other hand, $V_C$ is applied to the meter M in a manner as previously described. During this control operation, the output of CP1 always remains at L level and therefore the diaphragm can not be stop-locked before its aperture has reached the value preset by the preset-ring of the lens. When the diaphragm value has reached the preset value, the shutter is controlled by the voltage $V_A$ in a manner as previously described.

In order to control the exposure in a so-called shutter preference mode in which a shutter speed is predetermined by a manual setting operation, this can be attained using a well-known technique. For example, a variable resistance interlocked with the shutter speed setting dial on the camera may be used in such manner that a voltage corresponding to the set shutter speed may be applied to the point B.

While in the above described embodiment such control system has been shown and described in detail in which, when the shutter is to be controlled again after the diaphragm has been controlled by the diaphragm control apparatus, the information of the controlled diaphragm is obtained by measuring the quantity of light passed through the diaphragm, the present invention is equally applicable to other control systems. For example, the present invention is applicable to such system in which displacement or position signal of a member used for driving the diaphragm blade is electrically detected.

In the above described embodiments, if a value other than the minimum aperture is erroneously set on the diaphragm ring in program mode or in shutter preference mode, then it will become impossible to carry out controlling values less than the set aperture. In this case, the control will be carried out with the aperture value set on the diaphragm ring working as if it were the minimum aperture. However, even in such case, it is possible to indicate a shutter speed correctly controlled by introducing into the circuit the set value of aperture through the resistor R4.

As will be understood from the foregoing, in the exposure control apparatus in accordance with the invention, the two memory operations of the condensers C1 and C2 are controlled initially by the switch S1 as a trigger and thereafter by using electric control means. Therefore, a substantial simplification of the mechanism of camera is attainable according to the invention.

While the invention has been particularly shown and described with reference to preferred embodiments thereof, it will be understood by those skilled in the art that the foregoing and other changes in form and details can be made therein without departing from the spirit and scope of the invention.

We claim:

1. In a TTL metering system automatic exposure control camera having:
- a metering circuit for producing an output information of the brightness of an object to be photographed;
- a diaphragm control device for controlling a diaphragm mechanism of a photographing lens mounted on the camera in response to the output coming from said metering circuit;
- a circuit for producing a control signal corresponding to the shutter speed determined in accordance with information relating to the intensity of light of said object passed through the diaphragm controlled by said diaphragm control device; and
- a shutter control device for controlling a shutter mechanism in response to said control signal, the improvement comprising:
    - (a) a switch means (210) in link with a shutter releasing operation and operable before the diaphragm being controlled by said diaphragm control device;
    - (b) a first holding circuit (211) connected with said switch means and also connected to said metering circuit in such manner that said first holding circuit holds information of the brightness of said object obtained at the time of said switch means being actuated;
    - (c) a delay circuit (213) which is brought into operation interlocked with said switch means and produces an output signal after a predetermined time ending with the completion of control by said diaphragm control device has been elapsed;
    - (d) a second holding circuit (212) connected with said delay circuit and also connected to said control signal generating circuit in such manner that said second holding circuit holds said control signal at the time of said output signal being received;
    - (e) means for putting the output of said first holding circuit into said diaphragm control device; and
    - (f) means for putting the output of said second holding circuit into said shutter control device.

2. A camera as claimed in claim 1, wherein said metering circuit includes a circuit (2) for generating a preset signal corresponding to the shutter speed determined in accordance with the information of the brightness of said object.

3. A camera as claimed in claim 2, wherein said diaphragm control device includes:
- a circuit (1) for producing a diaphragm control signal corresponding to the shutter speed determined in accordance with the information relating to the intensity of light of said object passed through the diaphragm which is still being controlled by said diaphragm control device; and
- means (CP1, Mg1) for comparing said diaphragm signal with said preset signal and bringing said diaphragm into stop-engagement when said two signals reach a predetermined relation.

4. A camera as claimed in claim 1, wherein said first holding circuit includes:
- a condenser (C1) for continuously storing the information of voltage level of said metering circuit; and
- an analogue switch (F4) operable in link with said switch means and disposed in such manner that when actuated, said analogue switch fixes the voltage level of said condenser.

5. A camera as claimed in claim 1, wherein said second holding circuit includes:
- a condenser (C2) for continuously storing the information of output voltage level of said control signal generating circuit; and
- an analogue switch (F5) operable in link with the output signal of said delay circuit and disposed in such manner that when actuated, said analogue switch fixes the voltage level of said condenser.

* * * * *